United States Patent [19]
Crane

[11] Patent Number: 5,345,360
[45] Date of Patent: Sep. 6, 1994

[54] SWITCHED RECEPTACLE CIRCUIT

[75] Inventor: Burke J. Crane, Lombard, Ill.

[73] Assignee: Molex Incorporated, Lisle, Ill.

[21] Appl. No.: 914,964

[22] Filed: Jul. 16, 1992

Related U.S. Application Data

[63] Continuation-in-part of Ser. No. 837,845, Feb. 18, 1992, Pat. No. 5,281,859.

[51] Int. Cl.$^5$ ............................................. H01H 47/04
[52] U.S. Cl. ................................ 361/160; 361/208; 361/189
[58] Field of Search .............. 307/138, 139; 361/160, 361/187, 168.1, 153, 155, 156, 208, 189, 154, 160, 187

[56] References Cited

U.S. PATENT DOCUMENTS

| | | | |
|---|---|---|---|
| 3,273,039 | 9/1966 | Godshalk et al. | 320/26 |
| 3,562,602 | 2/1971 | Mlacak et al. | 317/154 |
| 3,683,239 | 8/1972 | Sturman | 317/150 |
| 3,686,508 | 8/1972 | Arave | 307/139 |
| 3,731,179 | 5/1973 | Rademaker | 321/15 |
| 4,153,922 | 5/1979 | Azuma et al. | 361/3 |
| 4,532,570 | 7/1985 | Thornley et al. | 361/93 |
| 5,016,134 | 5/1991 | Chang et al. | 361/153 |

Primary Examiner—A. D. Pellinen
Assistant Examiner—Aditya Krishnan
Attorney, Agent, or Firm—Stephen Z. Weiss

[57] ABSTRACT

A switched receptacle includes a latching relay selectively providing power to an outlet receptacle. The latching relay is controlled to insure that a flux density in the set mode is no greater than that which is needed to actuate the latching relay while allowing the latch to remain in the actuated position even if this power is terminated. Current limiting is provided for resetting so that zero flux density results when unlatching.

19 Claims, 2 Drawing Sheets

SWITCHED RECEPTACLE CIRCUIT

CROSS-REFERENCE

This application is a continuation-in-part of application Ser. No. 07/837,845, filed Feb. 18, 1992 now U.S. Pat. No. 5,281,859.

FIELD OF THE INVENTION

This invention relates to electrical outlet receptacles and, more particularly, to a switching circuit therefor.

BACKGROUND OF THE INVENTION

In providing electrical circuits to a facility, such as a home or office building, one or more branch circuits are wired to distribute electrical power to load devices, such as light fixtures or outlet receptacles. Often, the receptacle or fixture is hardwired directly to the branch circuit with power to the device being turned on or off at the device itself. For example, a light fixture might include a pull cord for actuating a switch, while a small appliance might include a power switch.

With recent technological developments it is both possible and advantageous to provide automated control of load devices to provide, for example, remote or timed switching.

In a larger facility, power distribution systems often include a single source of power providing power to plural electrical branch circuits. Hardwiring of load devices to the different branch circuits can result in load imbalance, depending on the actual power requirement of each load. This problem is particularly acute in an office environment with the advent of using modular furniture systems. Co-pending application Ser. No. 714,487, assigned to the assignee hereof, discloses a power switching circuit for selectively connecting an electrical load to any one of a plurality of branch power circuits. This circuit uses a manually operated branch circuit selection switch.

Co-pending application Ser. No. 07/837,845, also assigned to the assignee hereof, discloses a power switching circuit for selectively, automatically connecting an electrical load to any one of a plurality of branch power circuit.

The present invention is intended to improve upon the power switching systems discussed above, in a novel and simple manner.

SUMMARY OF THE INVENTION

In accordance with the invention, there is provided a control circuit controlling switching of a latching relay having an electrical contact for powering an outlet receptacle.

Broadly, there is disclosed herein a control circuit controlling switching of a latching relay having a relay coil and an electrical contact switched by the relay coil. The relay coil is latched when connected to a positive polarity voltage source and unlatched when connected to a negative polarity voltage source. The control circuit includes a power source developing a voltage at a select potential. A first switch is selectively operated to be in a neutral state or an actuated state, the first switch conducting electricity incident to being in the actuated state and not conducting electricity incident to being in the neutral state. A second switch is selectively operated to be in a neutral state or an actuated state, the second switch conducting electricity incident to being in the actuated state and not conducting electricity incident to being in the neutral state. Circuit means are provided for connecting the first and second switches between the power source and the relay coil so that when the first switch is in the actuated state it conducts electricity to apply the potential of the power source to the relay coil at positive polarity to latch the relay coil, and when the second switch is in the actuated state it conducts electricity to apply the potential of the power source to the relay coil at negative polarity to unlatch the relay coil. Current limit means electrically connected between the second switch and the relay coil limit current conducted to unlatch the relay coil.

It is a feature of the invention that the current limit means comprises a resistor.

It is another feature of the invention that the resistor is in series connection with the second switch circuit.

In accordance with one aspect of the invention, the first and second switch circuits together comprise a three-position switch having a movable contact and two fixed contacts. The first switch circuit consists of the first fixed contact and the movable contact with the first switched circuit being in the neutral state when the movable contact is remote from the first fixed contact and the actuated state when the movable contact is in contact with the first fixed contact. The second switch circuit consists of the second fixed contact and the movable contact, and the second switch circuit is in the neutral state when the movable contact is remote from the second fixed contact and in the actuated state when the movable contact is in contact with the second fixed contact.

In accordance with another aspect of the invention, the first and second switch circuits each comprises a switching transistor.

In accordance with still another aspect of the invention, the first and second switch circuits each comprises a pair of switching transistors connected to opposite sides of the relay coil.

More particularly, it is a feature of the invention that a first transistor of the first switch circuit connects a first side of the relay coil to a high side of the power source and a second transistor of the first switch circuit connects a second side of the relay coil to a low side of the power source, and a first transistor of the second switch circuit pair connects the second side of the relay coil to the high side of the power source and a second transistor of the second switch circuit connects the first side of the relay coil to a low side of the power source.

It is another feature of the invention that the first and second switch circuits are connected to provide an H-bridge circuit.

There is disclosed in accordance with another aspect of the invention a switched receptacle comprising a power source developing a voltage at a select potential. A latching relay has a relay coil and an electrical contact switched by the relay coil, the relay coil being latched when connected to a positive polarity voltage source and unlatched when connected to a negative polarity voltage source. An outlet receptacle is connected in series with the electrical contact to the power source. A first switch circuit is selectively operated to be in a neutral state or an actuated state, the first switch circuit conducting electricity incident to being in the actuated state and not conducting electricity incident to being in the neutral state. A second switch circuit is selectively operated to be in a neutral state or an actuated state, the second switch circuit conducting electricity incident to being in the actuated state and not conducting electricity incident to being in the neutral state. Circuit means are provided for connecting the first and second switch circuits between the power source and the relay coil, so that when the first switch circuit is in the actuated state it conducts electricity to apply the potential of the power source to the relay coil at positive polarity to latch the relay coil, and when the second switch circuit is in the actuated state it conducts electricity to apply the potential of the power source to the relay coil at negative polarity to unlatch the relay coil. Current limit means are electrically connected to the second switch circuit for limiting current conducted to unlatch the relay coil.

There is disclosed in accordance with another aspect of the invention a switched receptacle comprising a power source developing a voltage at a select potential and a latching relay having a relay coil and an electrical contact switched by the relay coil, the relay coil being latched when connected to a positive polarity voltage source and unlatched when connected to a negative polarity voltage source. An outlet receptacle is connected in series with the electrical contact to the power source. An H-bridge switching circuit is connected between the power source and the relay coil. Control means control operation of the H-bridge switching circuit between a set mode and a reset mode, the set mode comprising controlling the H-bridge switching circuit to apply the potential of the power source to the relay coil at positive polarity to latch the relay coil. The reset mode comprises controlling the H-bridge switching circuit to apply the potential of the power source to the relay coil at negative polarity to unlatch the relay coil. Current limit means operatively connected to the H-bridge circuit limits current conducted to unlatch the relay coil.

More particularly, the disclosed subject matter insures that a flux density in the set mode is no greater than that which is needed to actuate the latching relay while allowing the latch to remain in the actuated position even if this power is terminated. Current limiting is provided for resetting so that zero flux density results when unlatching.

Further features and advantages of the invention will readily be apparent from the specification and from the drawings.

DETAILED DESCRIPTION OF THE INVENTION

Figure 1:
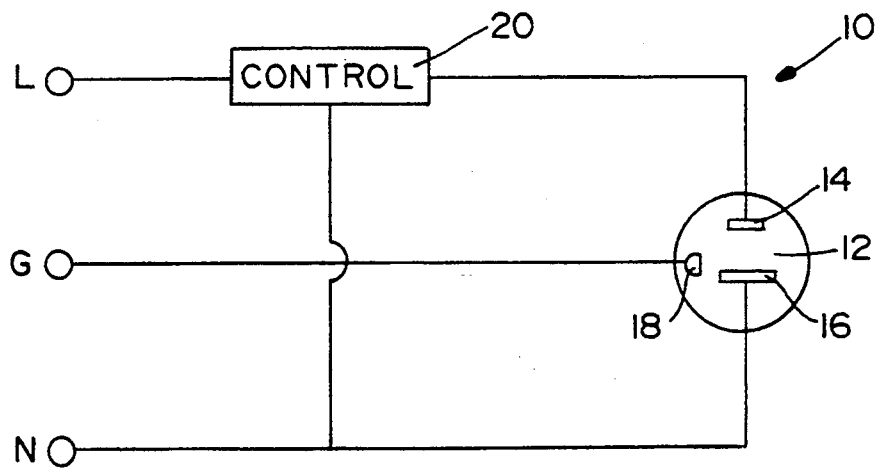
FIG. 1 is a generalized block diagram illustrating a switched receptacle according to the invention.

With reference to FIG. 1, a switched power receptacle 10 is illustrated. The switched receptacle 10 includes an outlet receptacle 12 of conventional construction. Particularly, the outlet receptacle 12 includes a first input connection 14, a second input connection 16 and a third input connection 18. These three input connections 14, 16 and 18 receive the prongs of a conventional three-prong plug (not shown). Indeed, the outlet receptacle 12 is used for supplying power to the plug from a conventional source of AC power, illustrated by terminals labeled L, G and N. In a 120 volt AC power system, the terminal L represents the high side of the power source, the terminal N the low side of the power source and the terminal G is ground. The terminal N is connected to the second input connection 16. The terminal G is connected to the third input connection 18. The terminal L is connected to the first input connection 14 via a control block 20.

In accordance with the invention, the control block 20 includes suitable circuitry, described below, for controlling application of power to the outlet receptacle 12. Although not shown, the control block 20 could be used for selectively applying power to a light fixture or other type loading device, as necessary or desired. Moreover, the control block 20 can also be used for selectively connecting the second input connection 16 to the N terminal as specified in parent application, Ser. No. 07/837,845, filed Feb. 18, 1992 now U.S. Pat. No. 5,281,859.

Figure 2:
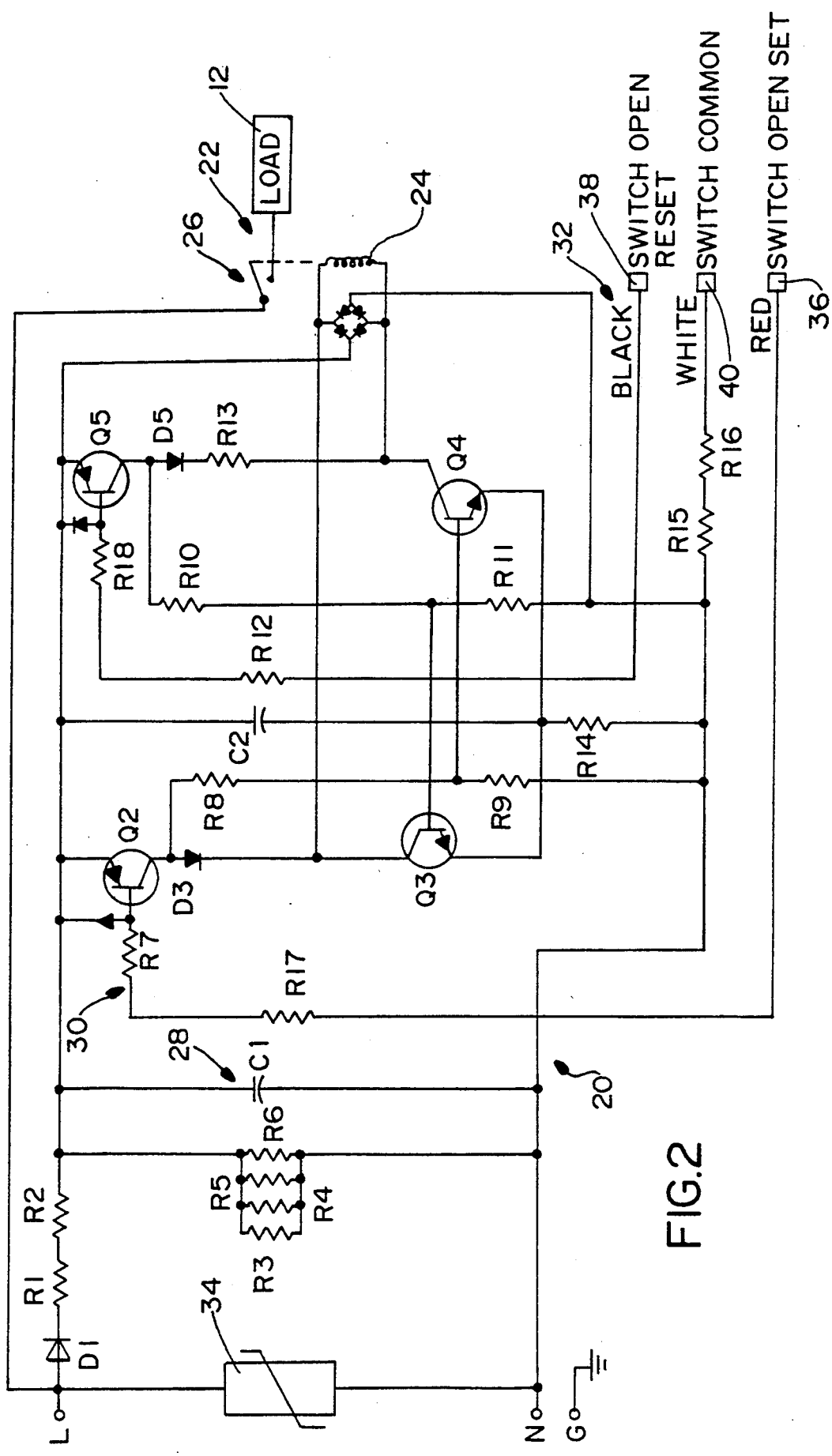
FIG. 2 is a schematic diagram illustrating a circuit for the control of FIG. 1 according to a first embodiment of the invention.

With reference to FIG. 2, a schematic diagram illustrates the control 20 according to a first embodiment of the invention. The control 20 includes a latching relay 22 having a relay coil 24 and an electrical contact 26 switched by the relay coil 24. The relay coil 24 is latched when connected to a positive polarity voltage source and unlatched when connected to a negative polarity voltage source. The electrical contact 26 is connected between the L terminal and the load 12 for selectively applying power to the same. In accordance with the invention, the latching relay 22 is permanently magnetized so that upon actuation by a relatively high current of positive polarity an included plunger is magnetically retained in an actuated position to close the contact 26. When a reverse polarity power source is connected to the relay coil 24, the magnetic field is reduced so that a spring force returns the plunger to an unlatched position opening the contact 26. In accordance with the invention, a current limit is provided so that zero flux density results after unlatching the latching relay 22.

The control circuit 20 includes a power supply circuit 28, an H-bridge switching circuit 30 and control circuit 32.

The power supply circuit 28 is connected to the 120 volt power source terminals L and N. Particularly, a surge protector 34 is connected across the inputs to protect the control circuit 20. A half-wave rectifier D1 rectifies the AC power. A voltage divider consisting of resistors R1, R2, R3, R4, R5 and R6, along with a filter capacitor C1, develop a DC voltage of approximately 24 volts across the capacitor C1 for powering the latching relay coil 24.

The H-bridge circuit 30 is used for controlling polarity of power supplied from the power supply circuit 28 to the latching relay 22. The H-bridge circuit 30 includes PNP transistors Q2 and Q5 having their emitters connected to a high side of the power supply 28. The collector of the transistor Q2 is connected via a diode D3 to a high side of the relay coil 24 and via a voltage divider comprising resistors R8 and R9 to the neutral terminal N. The junction between the resistors R8 and R9 is connected to the base of an NPN transistor Q4 having its collector connected to a low side of the latching relay coil 24. The emitter of the transistor Q4 is connected to the junction of a resistor R14 and capacitor C2 connected across the power supply 28. The capacitor C2 supplies energy to drive the relay coil 24.

The resistor R14 decouples the capacitor C2 from the H-bridge switching circuit 30.

The emitter of the transistor Q5 is connected via a diode D5 and current limiting resistor R13 to the low side of the latching relay coil 24. The collector of the transistor Q5 is also connected to a voltage divider consisting of resistors R10 and R11 to the negative terminal N. The junction between the resistors R10 and R11 is connected to the base of an NPN transistor Q3. A collector of the transistor Q3 is connected to the high side of the relay coil 24. The emitter of the transistor Q3 is connected to the junction between the capacitor C2 and the resistor R14.

The H-bridge switching circuit 30 is remotely controlled by a suitable circuitry as desired. One example of such a circuit is disclosed in co-pending application Ser. No. 07/837,845, filed Feb. 18, 1992 now U.S. Pat. No. 5,281,859, the specification of which is hereby incorporated by reference herein. The control circuit 32 includes a set input terminal 36, a reset terminal 38 and a common terminal 40. The common terminal 40 is connected via resistors R15 and R16 to the negative terminal N. The set terminal 36 is connected via current limit resistors R17 and R7 to the base of the transistor Q2. The reset terminal 38 is connected via resistors R12 and R18 to the base of the transistor Q5.

The operation of the control 20 is described assuming that in its initial state the latching relay 22 is unlatched.

To latch the latching relay 22, the remote controlling circuit may be operated in any known manner for providing electrical connection between the switch common terminal 40 and the set terminal 36. Doing so switches the transistor Q2 to on, which in turn through the resistor R8 turns the transistor Q4 on. This connects the high side of the relay coil 24 to the high side of the power source 28 via the transistor Q2 and the low side of the relay coil 24 to the low side of the power supply 28 through the transistor Q4. The positive polarity current level is controlled such that the relationship with the relay coil 24 is sufficient that the positive ampere turns will create a flux density to hold the relay coil latch even after termination of power. As such, only a momentary actuation of the set terminal 36 is required.

To unlatch the relay 22, the reset terminal 38 is connected by the remote controlling circuit to the common terminal 40 to turn the transistor Q5 on. Thus, the transistor Q5 connects the low side of the latching relay coil 24 to the high side of the power supply 28. The transistor Q5 also drives the transistor Q3 via the resistor R10 to connect the high side of the relay coil to the low side of the power supply 28 to provide negative polarity power across the relay coil 24. However, the current is limited by the current limit resistor R13 so that the negative ampere turns will create a zero flux density to reverse the latch. Particularly, the current limit resistor R13 prevents an unwanted negative flux density in the relay coil 24.

Figure 3:
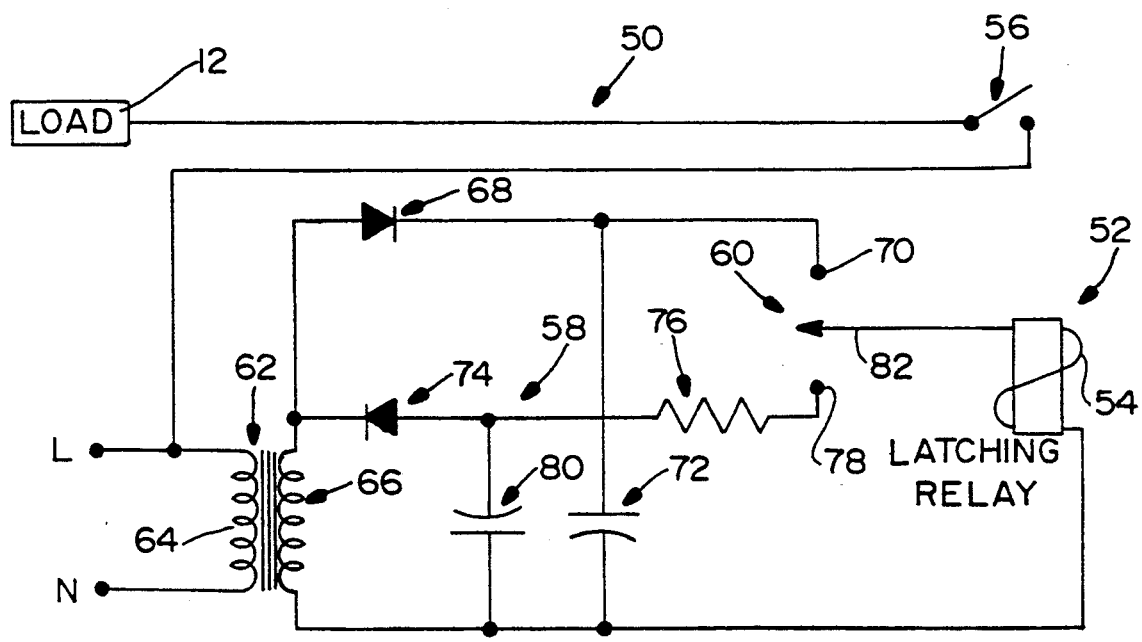
FIG. 3 is a schematic diagram illustrating a circuit for the control of FIG. 1 for a second embodiment of the invention.

With reference to FIG. 3, a control 50 according to an alternative embodiment of the invention is illustrated.

The control 50 includes a latching relay 52 having a relay coil 54 and electrical contact 56. The latching relay 52 is similar to the latching relay 22 discussed above relative to FIG. 2. The electrical contact 54 is used for selectively providing power from a power terminal L to a load in the form of the outlet receptacle 12, see FIG. 1.

The control 50 includes a power supply circuit 58 and a selector switch 60.

The power supply circuit 58 includes a transformer 62 having a primary winding 64 connected across power terminals L and N. The transformer 62 includes a secondary winding 66. The transformer 62 in the illustrated embodiment steps the nominal primary voltage, 120 volts AC, to 18 volts AC across the secondary winding 66. A high side of the secondary winding 66 is connected to a forward biased diode 68 to a first fixed contact 70 of the selector switch 60. A filter capacitor 72 is connected between the low side of the secondary winding 66 and the junction between the diode 68 and first fixed contact 70. A reverse biased diode 74 is also connected to the high side of the secondary winding 66 and via a current limit resistor 76 to a second fixed contact 78 of the selector switch 60. A filter capacitor 80 is connected between the low side of the secondary winding 66 and the junction between the diode 74 and current limit resistor 76. With the above circuit, the positive polarity voltage is present between the first fixed contact 70 and the low side of the secondary winding 66, while a negative polarity voltage exists across the second fixed contact 78 and low side of the secondary winding 66.

The selector switch 60 comprises a single pole double throw center off selector switch having a movable contact 82 normally spaced from the fixed contacts 70 and 78. The movable contact 82 is connected to a high side of the relay coil 54. The low side of the relay coil 54 is connected to the low side of the secondary winding 66.

To latch the relay coil 54, the movable contact 82 is moved from the center, neutral position to an actuated position in contact with the first fixed contact 70. This connects the relay coil 54 to the source of positive polarity power to latch the relay coil 54, as discussed above. The relay 52 remains latched after the movable contact 82 returns to the central, neutral position and the contact 56 remains closed. To unlatch the relay 52, the movable contact 82 is momentarily positioned in contact with the second fixed contact 78 to provide negative polarity power connected across the relay coil 54 to unlatch the same and open the electrical contact 56. The current limit resistor 76 insures that a zero flux density is provided in the latching relay 52, as above.

Thus, in accordance with the invention, a latching relay is latched or set by applying a positive polarity DC voltage across its coil and is unlatched to reset by applying a negative polarity DC voltage across its coil. In accordance with both embodiments disclosed herein, a flux density is provided in the set position which is no greater than that which is needed to actuate the latching relay while allowing the relay to remain latched in the actuated position even if power is terminated. Also, a specific ampere turn results in zero flux density owing to the current limit resistor so that the latch relay can be pulled back to its open position when reset without a negative flux density being created.

Thus, in accordance with the invention there is disclosed a switched power receptacle including a control circuit controlling switching of a latching relay which limits current conducted to unlatch the relay.

I claim:

1. A control circuit controlling switching of a latching relay having a relay coil and an electrical contact switched by said relay coil, said relay coil being latched when connected to a positive polarity voltage source and unlatched when connected to a negative polarity voltage source, comprising:

a power source developing a voltage at a select potential;

a first switch circuit selectively operated to be in a neutral state or an actuated state, said first switch circuit conducting electricity when it is operated to be in the actuated state and not conducting electricity when it is operated to be in the neutral state;

a second switch circuit selectively operated to be in a neutral state or an actuated state, said first switch circuit conducting electricity when it is operated to be in the actuated state and not conducting electricity when it is operated to be in the neutral state;

circuit means for connecting said first and second switch circuits between said power source and said relay coil so that when said first switch circuit is in the actuated state it conducts electricity to apply said potential of said power source to said relay coil at positive polarity to latch the relay coil, and when said second switch circuit is in the actuated state it conducts electricity to apply said potential of said power source to said relay coil at negative polarity to unlatch the relay coil; and current limit means electrically connected to said second switch circuit for limiting current conducted to unlatch said relay coil.

2. The control circuit of claim 1 wherein said current limit means comprises a resistor.

3. The control circuit of claim 2 wherein said resistor is series connected with said second switch circuit.

4. The control circuit of claim 1 wherein said first and second switch circuits together comprise a three position switch having a movable contact and two fixed contacts, the first switch circuit consisting of the first fixed contact and the movable contact and the first switch circuit being in the neutral state when the movable contact is remote from the first fixed contact and in the actuated state when the movable contact is in contact with the first fixed contact, and the second switch circuit consisting of the second fixed contact and the movable contact and the second switch circuit being in the neutral state when the movable contact is remote from the second fixed contact and in the actuated state when the movable contact is in contact with the second fixed contact.

5. The control circuit of claim 1 wherein said first and second switch circuits each comprises a switching transistor.

6. The control circuit of claim 1 wherein said first and second switch circuits each comprises a pair of switching transistors connected to opposite sides of the relay coil.

7. The control circuit of claim 6 wherein a first transistor of the first switch circuit pair connects a first side of the relay coil to a high side of the power source and a second transistor of the first switch circuit connects a second side of the relay coil to a low side of the power source, and a first transistor of the second switch circuit pair connects the second side of the relay coil to the high side of the power source and a second transistor of the second switch circuit connects the first side of the relay coil to a low side of the power source.

8. The control circuit of claim 7 wherein said first and second switch circuits are connected to provide an H-bridge circuit.

9. A switched power receptacle comprising:

a power source developing a voltage at a select potential;

a latching relay having a relay coil and an electrical contact switched by said relay coil, said relay coil being latched when connected to a positive polarity voltage source and unlatched when connected to a negative polarity voltage source;

an outlet receptacle connected in series with said electrical contact to said power source;

a first switched circuit selectively operated to be in a neutral state or an actuated state, said first switch circuit conducting electricity when it is operated to be in the actuated state and not conducting electricity when it is operated to be in the neutral state;

a second switch circuit selectively operated to be in a neutral state or an actuated state, said second switch circuit conducting electricity when it is operated to be in the actuated state and not conducting electricity when it is operated to be in the neutral state;

circuit means for connecting said first and second switch circuits between said power source and said relay coil so that when said first switch circuit is in the actuated state it conducts electricity to apply said potential of said power source to said relay coil at positive polarity to latch the relay coil, and when said second switch circuit is in the actuated state it conducts electricity to apply said potential of said power source to said relay coil at negative polarity to unlatch the relay coil; and current limit means electrically connected to said second switch circuit for limiting current conducted to unlatch said relay coil.

10. The switched receptacle of claim 9 wherein said current limit means comprises a resistor.

11. The switched receptacle of claim 10 wherein said resistor is series connected with said second switch circuit.

12. The switched receptacle of claim 9 wherein said first and second switch circuits together comprise a three position switch having a movable contact and two fixed contacts, the first switch circuit consisting of the first fixed contact and the movable contact and the first switch circuit being in the neutral state when the movable contact is remote from the first fixed contact and in the actuated state when the movable contact is in contact with the first fixed contact, and the second switch circuit consisting of the second fixed contact and the movable contact and the second switch circuit being in the neutral state when the movable contact is remote from the second fixed contact and in the actuated state when the movable contact is in contact with the second fixed contact.

13. The switched receptacle of claim 9 wherein said first and second switch circuits each comprises a switching transistor.

14. The switched receptacle of claim 9 wherein said first and second switch circuits each comprises a pair of switching transistors connected to opposite sides of the relay coil.

15. The switched receptacle of claim 14 wherein a first transistor of the first switch circuit pair connects a first side of the relay coil to a high side of the power source and a second transistor of the first switch circuit connects a second side of the relay coil to a low side of the power source, and a first transistor of the second switch circuit pair connects the second side of the relay coil to the high side of the power source and a second transistor of the second switch circuit connects the first side of the relay coil to a low side of the power source.

16. The switched receptacle of claim 15 wherein said first and second switch circuits are connected to provide and H-bridge circuit.

17. A switched receptacle comprising:
a power source developing a voltage at a select potential;
a latching relay having a relay coil and an electrical contact switched by said relay coil, said relay coil being latched when connected to a positive polarity voltage source and unlatched when connected to a negative polarity voltage source;
an outlet receptacle connected in series with said electrical contact to said power source;
an H-bridge switching circuit connected between said power source and said relay coil;
control means for controlling operation of said H-bridge switching circuit between a set mode and a reset mode, said set mode comprising controlling said H-bridge switching circuit to apply said potential of said power source to said relay coil at positive polarity to latch the relay coil, said reset mode comprising controlling said H-bridge switching circuit to apply said potential of said power source to said relay coil at negative polarity to unlatch the relay coil; and
current limit means operatively connected to said H-bridge switching circuit for limiting current conducted to unlatch said relay coil.

18. The switched receptacle of claim 17 wherein said current limit means comprises a resistor.

19. A switched receptacle comprising:
a power source developing a voltage at a select potential;
a latching relay having a relay coil and an electrical contact switched by said relay coil, said relay coil being latched when connected to a positive polarity voltage source and unlatched when connected to a negative polarity voltage source;
an outlet receptacle connected in series with said electrical contact to said power source;
an H-bridge switching circuit connected between said power source and said relay coil;
control means for controlling operation of said H-bridge switching circuit between a set mode and a reset mode, said set mode comprising controlling said H-bridge switching circuit to apply said potential of said power source to said relay coil at positive polarity to latch the relay coil, said reset mode comprising controlling said H-bridge switching circuit to apply said potential of said power source to said relay coil at negative polarity to unlatch the relay coil.

* * * * *